(No Model.)
K. N. HARBOE.
VALVE.
No. 527,201. Patented Oct. 9, 1894.
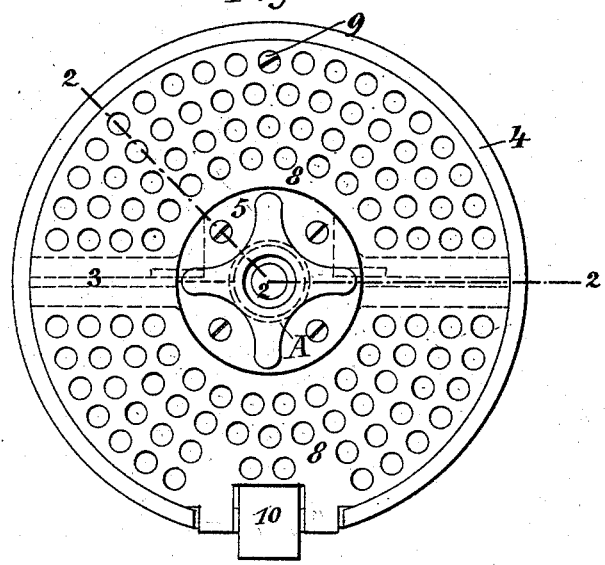
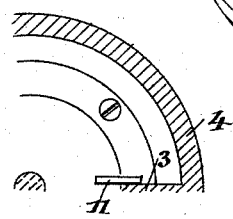 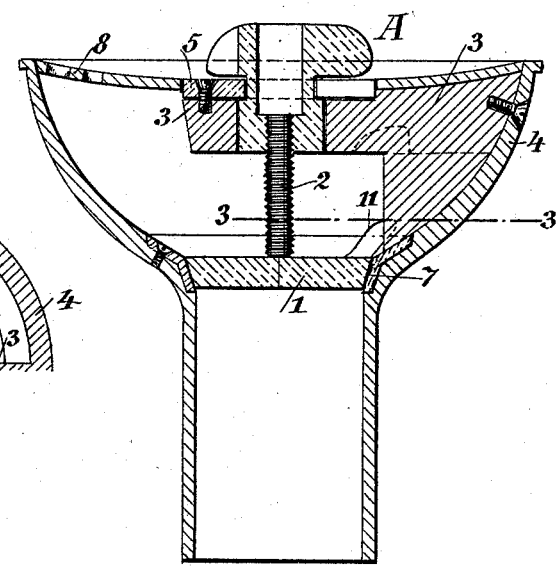
WITNESSES:
INVENTOR
K. N. Harboe
BY
ATTORNEYS.

UNITED STATES PATENT OFFICE.

KRISTEN NOE HARBOE, OF COPENHAGEN, DENMARK.

VALVE.

SPECIFICATION forming part of Letters Patent No. 527,201, dated October 9, 1894.

Application filed May 16, 1893. Serial No. 474,464. (No model.)

*To all whom it may concern:*

Be it known that I, KRISTEN NOE HARBOE, engineer, a citizen of Denmark, residing at Copenhagen, Denmark, have invented certain new and useful Improvements in Valves, of which the following is a specification.

Gates or valves for outlets such as cellar drains, cess pool outlets, &c., have various defects according as the gate is used for preventing the water from passing out of cess pools, &c., or if the valve is used for preventing water from flowing out of a receptacle. The vertically-movable slide-valves which are used for cess pools, sewers, &c., can only be cleaned with difficulty and it is quite difficult to attend to the same in case the valve or gate has not been used for some time, as the parts usually rust together. Furthermore, these slide-gates require so much space that frequently, especially for sinks, &c., they must be arranged outside of the building. If the valve or gate is used to prevent water from flowing off, the following difficulties are encountered: The valve must be so arranged that the coarse particles cannot pass into the cess pool. Furthermore, the valve or gate when open must prevent the accumulation of mud, so as to avoid decreasing the free outlet opening. Furthermore, the part above the valve must be arranged so that it can be cleaned easily, so that the water that is held back by the gate or valve is not infected. Automatic devices usually are not reliable.

This invention relates to a valve or gate which cannot get out of order and which can be cleaned very easily. It is arranged directly under the grating, but above the trap, which is of great importance, as the valve can then always operate and the persons having charge of it will always see it and become acquainted with its operation. The valve when closed prevents absolutely the water from cess pools from backing into a building and when opened permits the water to flow off rapidly. It avoids all the above defects when so adjusted as to prevent the water from flowing off.

The invention consists essentially of a cast-iron shell having transverse ribs through which a rod passes that carries a valve. The valve can be locked in two positions, one in which it prevents the water from backing up into the building and the other which permits the water to flow rapidly from the building.

In the accompanying drawings, Figure 1 is a plan-view of my improved water gate. Fig. 2 is a section, on the line 2 2, Fig. 1, and Fig. 3 is a section, on the line 3 3, Fig. 2.

Similar letters and numerals of reference indicate corresponding parts.

The valve 1 fitting on a suitable neck formed of a flanged ring 7 secured in the bottom of a cast basin 4, is attached to the lower end of the screw 2, the upper end of which screws into a nut A mounted to turn in a transverse rib 3 of said basin or bowl 4, which nut is prevented from traveling on the screw in the direction of its length by a plate 5, which enters an annular groove in the nut, said plate being held by screws on the rib 3, of the basin or bowl 4. To enable the plate 5 to enter the annular groove in the nut the same is formed in sections as shown in Fig. 1.

The valve 1 is provided with two lugs 11 that slide up and down on opposite sides of a guide forming a downward continuation of the rib 3 as shown in Fig. 3. As shown in Fig. 2, the valve is closed. By turning the nut A the screw 2 and the valve 1 attached thereto are raised, and when said valve is at its highest position, the area or passage to the outlet-pipe connected with the bottom of the bowl is at no place smaller than the area of the said outlet tube. The strainer or apertured top-plate 8 is preferably made of brass and is held down on the bowl by a screw 9, the opposite end of the strainer being connected with the bowl or basin by means of a hinge 10, so as to permit of readily raising the strainer for the purpose of cleaning the bowl or basin.

This valve is specially designed to prevent water backing up from cess pools, but it can also be used for closing pipes to prevent gas from passing up from the cess pools, especially when the water in the trap has evaporated. The valve can also be used for basins into which a fluid is conducted that contains coarser particles and prevents the latter from passing into the cess pools or vessel, and it can be used on fish-tanks, tubs, watering troughs, &c. If desired, a trap or water seal can be made integral with the frame or casing of this gate.

Having thus described my invention, I claim as new and desire to secure by Letters Patent—

1. In a gate or valve for outlet pipes, the combination with a basin or bowl provided with a movable top strainer having a central aperture and a transverse rib fixed to the basin and having an aperture registering with said aperture, of a valve adapted to seat in the outlet passage and having a spindle, and means attached to said spindle and extending through said central aperture of the strainer, whereby said valve may be operated, substantially as set forth.

2. In a gate or valve for outlet pipes, the combination with a basin or bowl provided with a movable top strainer having a central aperture and a transverse rib fixed to the basin and having an aperture registering with the aforesaid aperture, of a valve provided with a screw-threaded spindle and adapted to seat in the outlet passage, a nut adapted to receive said screw-threaded spindle and to turn within the aperture of said rib, said nut being provided with an annular groove, and means attached to said rib and projecting into said groove whereby relative longitudinal movement of said nut to said rib is prevented, substantially as set forth.

3. In a gate or valve for outlet pipes, the combination with a basin or bowl provided with a top-strainer hinged at one side to said basin and having a central aperture and a transverse rib fixed to the basin and having an aperture registering with the aforesaid aperture, of a valve adapted to seat in the outlet passage and having a screw-threaded spindle projecting upwardly into the aperture of said rib, a nut extending above the strainer and adapted to receive the screw-threaded spindle, said nut being provided with an annular groove and a plate secured to said rib and projecting into the groove of said nut, said plate being located within the aperture of the strainer, substantially as set forth.

In testimony that I claim the foregoing as my invention I have signed my name in presence of two subscribing witnesses.

KRISTEN NOE HARBOE.

Witnesses:
  L. HOFMAN BARY,
  FR. TOYBER.